US 8,350,726 B2

(12) United States Patent
Mathan et al.

(10) Patent No.: US 8,350,726 B2
(45) Date of Patent: Jan. 8, 2013

(54) GAZE-BASED TOUCHDOWN POINT SELECTION SYSTEM AND METHOD

(75) Inventors: Santosh Mathan, Seattle, WA (US); Patricia May Ververs, Ellicott City, MD (US)

(73) Assignee: Honeywell International Inc., Morristown, NJ (US)

( * ) Notice: Subject to any disclaimer, the term of this patent is extended or adjusted under 35 U.S.C. 154(b) by 904 days.

(21) Appl. No.: 12/468,605

(22) Filed: May 19, 2009

(65) Prior Publication Data

US 2010/0295706 A1 Nov. 25, 2010

(51) Int. Cl.
*B64F 1/18* (2006.01)
*G05D 1/12* (2006.01)
*G06F 3/033* (2006.01)
*G09G 5/08* (2006.01)

(52) U.S. Cl. ........ 340/951; 340/947; 340/959; 340/960; 340/980; 701/2; 701/15; 701/16; 345/7; 345/8; 345/157; 345/158

(58) Field of Classification Search ................ 340/947, 340/959, 960, 972, 980, 951; 701/14–16, 701/2; 345/7, 8, 156, 158, 157; 348/144–147
See application file for complete search history.

(56) References Cited

U.S. PATENT DOCUMENTS

| | | | | |
|---|---|---|---|---|
| 3,868,565 A | * | 2/1975 | Kuipers | 324/207.26 |
| 4,595,990 A | * | 6/1986 | Garwin et al. | 708/141 |
| 5,689,619 A | * | 11/1997 | Smyth | 706/45 |
| 5,715,163 A | * | 2/1998 | Bang et al. | 701/467 |
| 6,325,326 B1 | * | 12/2001 | Pancotti | 244/17.25 |
| 7,091,881 B2 | * | 8/2006 | Judge et al. | 340/979 |
| 7,542,210 B2 | * | 6/2009 | Chirieleison, Sr. | 359/630 |
| 7,963,618 B2 | * | 6/2011 | Stone et al. | 301/16 |
| 8,120,577 B2 | * | 2/2012 | Bouvin et al. | 345/157 |
| 2006/0238377 A1 | | 10/2006 | Stiles et al. | |
| 2008/0036875 A1 | * | 2/2008 | Jones et al. | 348/222.1 |
| 2009/0105891 A1 | * | 4/2009 | Jones et al. | 701/2 |
| 2009/0112469 A1 | | 4/2009 | Lapidot et al. | |
| 2009/0147331 A1 | * | 6/2009 | Ashkenazi | 359/13 |
| 2010/0156758 A1 | * | 6/2010 | Anders | 345/8 |
| 2010/0238161 A1 | * | 9/2010 | Varga et al. | 345/419 |
| 2010/0250030 A1 | * | 9/2010 | Nichols et al. | 701/7 |

FOREIGN PATENT DOCUMENTS

| | | |
|---|---|---|
| EP | 1959239 A1 | 8/2008 |
| WO | 2004099851 A2 | 11/2004 |
| WO | 2009010969 A2 | 1/2009 |
| WO | 2009081177 A2 | 7/2009 |

OTHER PUBLICATIONS

EP Communication, EP 10162366.8-1232 dated Jun. 20, 2011.
EP Search Report, EP 10162366.8-1232/2254105 dated Feb. 16, 2011.

* cited by examiner

*Primary Examiner* — George Bugg
*Assistant Examiner* — Anne Lai
(74) *Attorney, Agent, or Firm* — Ingrassia Fisher & Lorenz, P.C.

(57) ABSTRACT

Methods and apparatus are provided for selecting a touchdown point for a vertical takeoff and landing aircraft. The eye movements of a user are tracked relative to an image being rendered on a display screen. An updated touchdown point location is determined from the tracked eye movements, and an updated touchdown point is rendered at the updated touchdown point location on the display screen.

18 Claims, 3 Drawing Sheets

GAZE-BASED TOUCHDOWN POINT SELECTION SYSTEM AND METHOD

TECHNICAL FIELD

The present invention generally relates to displaying a touchdown point for a vertical take-off and landing (VTOL) aircraft, and more particularly relates to a system and method for updating and rendering the touchdown point for a VTOL aircraft.

BACKGROUND

Some vertical take-off and landing (VTOL) aircraft may need to land during non-ideal environmental conditions. These non-ideal environmental conditions may, at times, reduce pilot visibility. To enhance pilot landing capabilities under such circumstances, some VTOL aircraft can be equipped with relatively advanced display equipment to display surrounding terrain to the pilot within the cockpit. The terrain that is displayed may be obtained from detailed terrain data stored in a terrain database and/or from one or more active sensors, such as high-resolution RADAR or LIDAR. Moreover, in VTOL aircraft equipped with automated flight controls (e.g., an autopilot), the detailed terrain data may be supplied to the automated flight controls to land the aircraft.

In current VTOL aircraft, the automated flight controls only enable a stabilized approach to a hover point. During the maneuver to the ground, the pilot may still need to explicitly specify, visually confirm or modify, and continually monitor the touchdown point. In some implementations, the VTOL automated flight controls include a mechanical hardware control device that may be used to make fine grained adjustments to the touchdown point. This control device may be located, for example, on the VTOL vehicle cyclic or collective. This same control device may also be used to make relatively larger grained adjustments to the touchdown point. While this is certainly a workable arrangement, it can lead to an undesired increase in pilot workload. Additionally, this arrangement may potentially cause pilot confusion, resulting in unintended disengagement of the automated flight controls during the landing procedure.

Hence, there is a need for a system and method of specifying, visually confirming or modifying, and continually monitoring the touchdown point of a VTOL vehicle that does not lead to an undesirable increase in pilot workload and/or reduces the likelihood of an inadvertent disengagement of the automated flight controls. The present invention addresses at least these needs.

BRIEF SUMMARY

In one embodiment, a method of selecting a touchdown point for a vertical takeoff and landing aircraft includes tracking eye movements of a user relative to an image being rendered on a display screen. An updated touchdown point location is determined from the tracked eye movements, and an updated touchdown point is rendered at the updated touchdown point location on the display screen.

In another embodiment, a vertical takeoff and landing (VTOL) aircraft touchdown point selection and display system includes a display device, an eye tracker, and a processor. The display device is coupled to receive image rendering display commands and is configured, upon receipt of the image rendering display commands, to render an image. The eye tracker is configured to track eye movements of a user relative to the image being rendered by the display device and to supply eye movement data. The processor is in operable communication with the display device and the eye tracker. The processor is configured, upon receipt of the eye movement data, to determine an updated touchdown point location and to supply image rendering display commands to the display device that cause the display device to render an updated touchdown point at the updated touchdown point location.

In yet another embodiment, a vertical takeoff and landing (VTOL) aircraft touchdown point selection and display system includes a display device, an eye tracker, a head tracker, and a processor. The display device is coupled to receive image rendering display commands and is configured, upon receipt of the image rendering display commands, to render an image. The eye tracker is configured to track eye movements of a user relative to the image being rendered by the display device and to supply eye movement data. The head tracker is configured to track head movements of the user and supply head movement data. The processor is in operable communication with the display device, the eye tracker, and the head tracker. The processor is configured, upon receipt of the eye movement data and the head movement data, to determine an updated touchdown point location and to supply image rendering display commands to the display device that cause the display device to render an updated touchdown point at the updated touchdown point location.

Furthermore, other desirable features and characteristics of the system and method will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
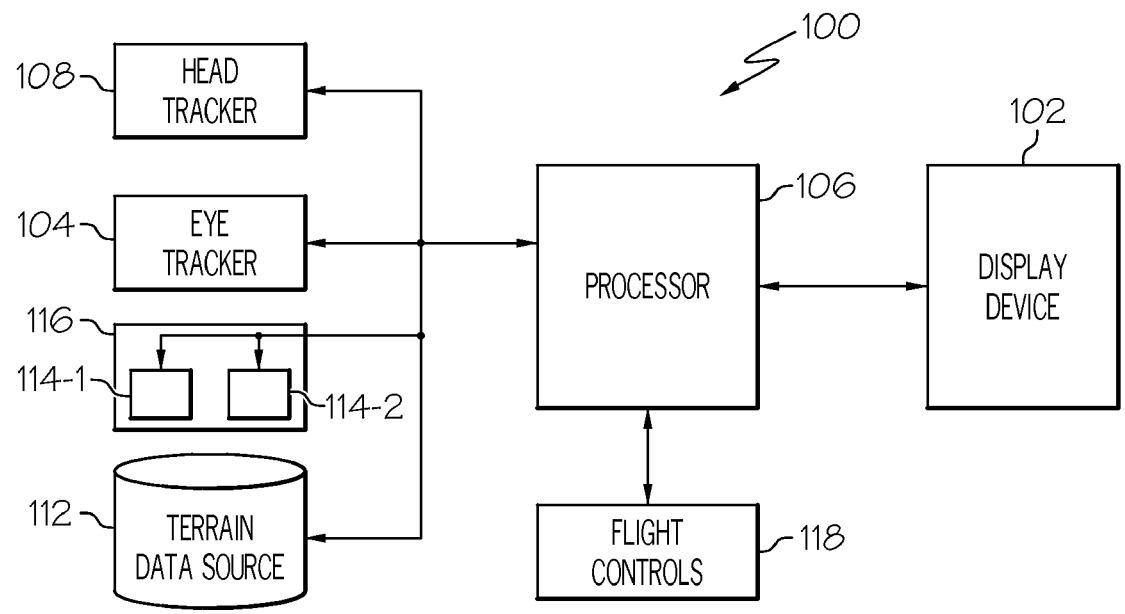
FIG. 1 depicts a functional block diagram of an exemplary vertical takeoff and landing (VTOL) aircraft touchdown point selection and display system.

Referring now to FIG. 1, a functional block diagram of an exemplary vertical takeoff and landing (VTOL) aircraft touchdown point selection and display system is depicted. The exemplary system 100 includes at least a display device 102, an eye tracker 104, and a processor 106. The display device 102 is in operable communication with, and is coupled to receive image rendering display commands supplied from, the processor 106. The display device 102 is configured, upon receipt of the image rendering display commands, to render various images. It will be appreciated that the display device 102 may be any one of numerous known display devices suitable for rendering graphic, icon, and/or textual images in a viewable format. Non-limiting examples of such display devices include various cathode ray tube (CRT) displays, and various flat panel displays such as, for example, various types of LCD (liquid crystal display) and TFT (thin film transistor) displays. The display device 102 may additionally be based on a panel mounted display, a head up display (HUD) projection, near-to-eye (NTE) display, or any known technology. Moreover, although the display device 102, at least in the depicted embodiment, is in operable communication with the processor 106 via a suitable cable or other hardware, it will be appreciated this is merely exemplary and that the communication between the display device 102 and the processor may be implemented wirelessly.

The eye tracker 104 is configured to track eye movements of a user relative to the image being rendered by the display device 102, and to supply eye movement data to the processor 106. More specifically, the eye tracker 104 is configured to detect the movement of one or both of a user's pupils to determine the location or region on the rendered image at which the user is gazing. It will be appreciated that the eye tracker 104 may be implemented using any one of numerous eye tracker devices and technologies now known or developed in the future. No matter the particular manner in which the eye tracker 104 is implemented, it is noted that an eye tracker 104 more specifically measures the rotational movement of the user's eye(s) with respect to the user's head. It may thus be appreciated that in a particular preferred embodiment, user head movements are also preferably accounted for to more accurately determine gaze direction. Thus, in the depicted embodiment it is seen that the system 100 may also include a head tracker 108. The head tracker 108, if included, is configured to detect the movement and/or orientation of a user's head, and to supply head movement data to the processor 106.

Although any one of numerous devices may be used to implement the eye tracker 104 and head tracker 108, preferably one or more appropriately mounted and located devices, in conjunction with appropriate processing software components are used to implement the associated functions. Though not explicitly depicted in FIG. 1, appropriate signal sampling and processing circuitry, if needed or desired, may be coupled between the eye tracker 104 and/or the head tracker 108 and the processor 106. Moreover, while also not depicted in FIG. 1, it will be appreciated that the eye tracker 104 and header tracker 108 (if included) are preferably mounted on a suitable headgear device, which may be worn on the head of a user.

Before describing the processor 106 and its associated functionality, it is additionally seen that the system 100, at least in the depicted embodiment, further includes a terrain data source 112 and at least one user interface 114, each of which will now be described. The terrain data source 112 may be variously implemented. For example, it may be implemented using one or more sensors, a terrain database, or various combinations thereof. No matter its implementation, the terrain data source supplies data representative of the terrain over which the VTOL aircraft is (or will be) flying. Although the terrain data source 112 is depicted as being implemented separately from the processor 106, it will be appreciated that this is merely exemplary. In alternative embodiments, the terrain data source 112, if implemented as a terrain database, could be stored, in whole or in part, in non-illustraed memory within the processor 106.

The user interface(s) 114 is (are) configured to receive user input and, upon receipt of the user input, to supply user interface data. The user interface(s) 114 may be variously implemented, configured, and located. For example, in one embodiment the user interface(s) 114 may be implemented as one or more push-buttons, one or more rotatable knobs, one or more joysticks, or various combinations of such devices. If more than one user interfaces 114 are used, each may also be collocated on a control device 116, such as a cyclic or collective, or on a separate hardware device, or one or more of the user interfaces 114 may be disparately located. Nonetheless, it is seen that the depicted system 100 is implemented with two user interfaces 114—a gaze-initiation user interface 114-1 and a fine adjustment user interface 114-2. The purpose and function of these user interfaces 114 will now be briefly described.

The gaze-initiation user interface 114-1 is used by a user to selectively initiate and cease the processing of the eye movement data and head movement data by the processor 106. The gaze-initiation user interface 114-1 may be variously implemented, but in one embodiment it is implemented as a switch. The gaze-initiation user interface 114-1 may be configured as a push-button switch, a toggle switch, or any one of numerous other types of switches. No matter its specific implementation and configuration, in one position it supplies a signal to the processor 106 that will cause the processor 106 to initiate processing of the eye movement and head movement data, and in another position it supplies a signal (or ceases to supply a signal) to the processor 106 that will cause the processor 106 to stop processing of the eye movement and head movement data.

As will be described in more detail further below, the fine adjustment user interface 114-2 is used by a user to incrementally move a touchdown point. The fine adjustment user interface 114-2 may also be variously implemented, but in one embodiment it is implemented as a rotary device, such as a trackball. No matter its specific implementation and configuration, the fine adjustment user interface 114-2, when active and operated by a user, will supply fine-tuning touchdown point location data to the processor 106. The processor 106, as will be described further below, processes the fine-tuning touchdown point location data to incrementally move a rendered touchdown point.

The processor 106 is in operable communication with the display device 102, the eye tracker 104, the head tracker 108, the terrain data source 112, and the user interfaces 114. The processor 106 is configured to at least selectively receive data from one or more of the eye tracker 104, the head tracker 108, and the user interfaces 114, and to selectively retrieve terrain data from the terrain data source 112. The processor 106 is also configured to supply image rendering display commands to the display device 102 that cause the display device 102 to render various images.

Figure 2:
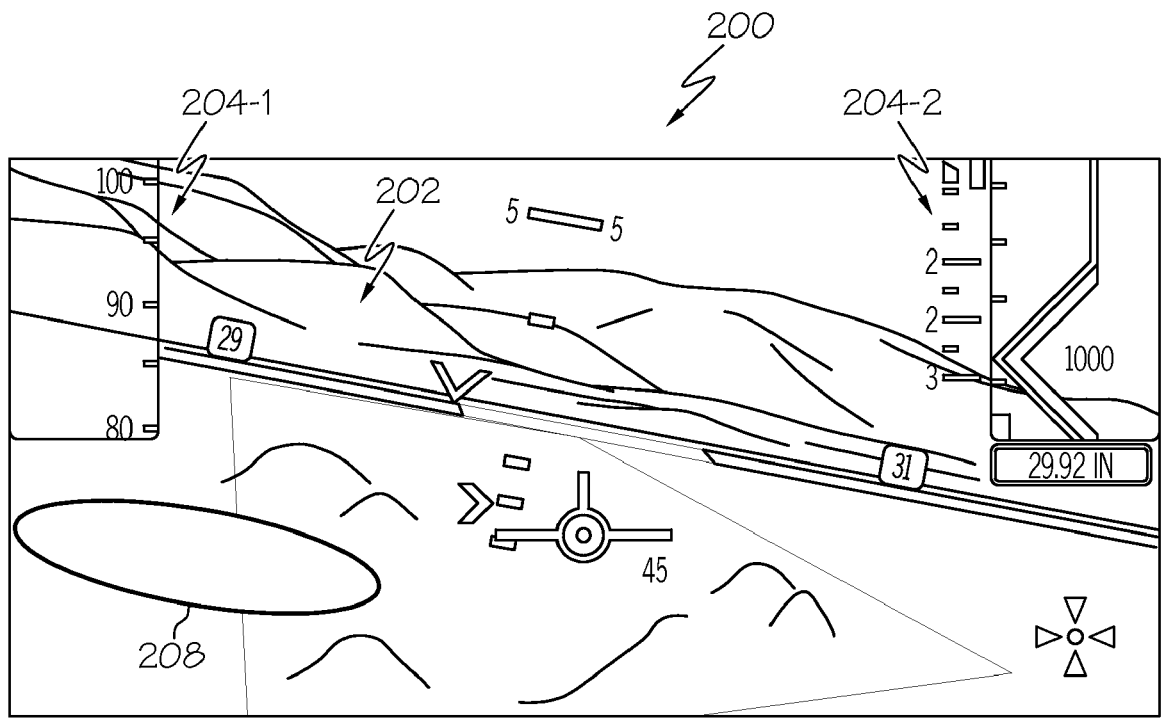
FIG. 2 depicts an exemplary image that may be rendered on a display device of the system of FIG. 1.

As an example of the images that the processor 106 may command the display device 102 to render, reference should now be made to FIG. 2. In this depicted example, the processor 106 has received terrain data from the terrain data source 112 and is supplying image rendering display commands to the display device 102 that cause the display device 102 to render at least an image of the terrain 202 over which the VTOL aircraft is and will be flying. In the depicted embodiment, the rendered image 200 also includes various flight-related instruments 204 (e.g., 204-1, 204-2) overlaid onto the terrain 202. As FIG. 2 also depicts, the rendered image of the terrain 202 includes a touchdown point 208.

Figure 3:
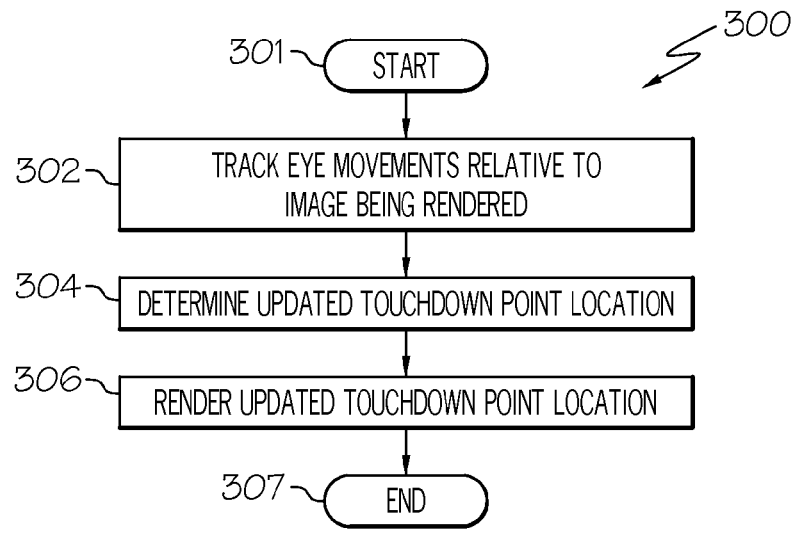
FIG. 3 depicts an exemplary method, in flow chart form, that is implemented in the system of FIG. 1 for selecting a touchdown point for a vertical takeoff and landing aircraft.

The system 100 described above and depicted in FIG. 1 implements a method whereby the touchdown point 208 depicted in FIG. 2 may be specified, visually confirmed or modified, and continually monitored without overburdening the pilot. The general methodology 300 that the system implements is depicted in flowchart form in FIG. 3, and includes tracking eye movements of a user relative to the image being rendered on the display device 102 (302). An updated touchdown point location is determined from the tracked eye movements (304), and an updated touchdown point is rendered at the updated touchdown point location on the display device 102 (306). With continued reference, as needed, to FIGS. 1-3, and with further reference to FIG. 4, the manner in which the system 100 implements this methodology 300 will now be described in more detail.

Initially, it is assumed that the display device 102 is rendering the image 200 that is depicted in FIG. 2. It is additionally assumed, however, that the pilot wishes to land the VTOL at a slightly different location than the presently rendered touchdown point 208, and thus needs to update the location of the touchdown point 208 so that the VTOL flight controls 116 (see FIG. 1) will automatically land the VTOL at the updated touchdown point location. In order to update the touchdown point location, the pilot initiates the gaze-based selection function. To do so, at least in the depicted embodiment, the pilot supplies user input to the gaze-initiation user interface 114-1, which supplies a suitable signal to the processor 106.

The processor 106, in response to the signal supplied from the gaze-initiation user interface 114-1, begins receiving and processing eye movement data from the eye tracker 104 and, if included, head movement data from the head tracker 108. The processor 106, upon receipt of these data, determines an updated touchdown point location. The processor 106 additionally supplies image rendering display commands to the display device 102 that cause the display device 102 to render an updated touchdown point 402 at the updated touchdown point location. The image 400 depicted in FIG. 4 reflects that the eye movement data indicates that the pilot is gazing at the location on the display device 102 that is represented by the rendered updated touchdown point 402.

Figure 4:
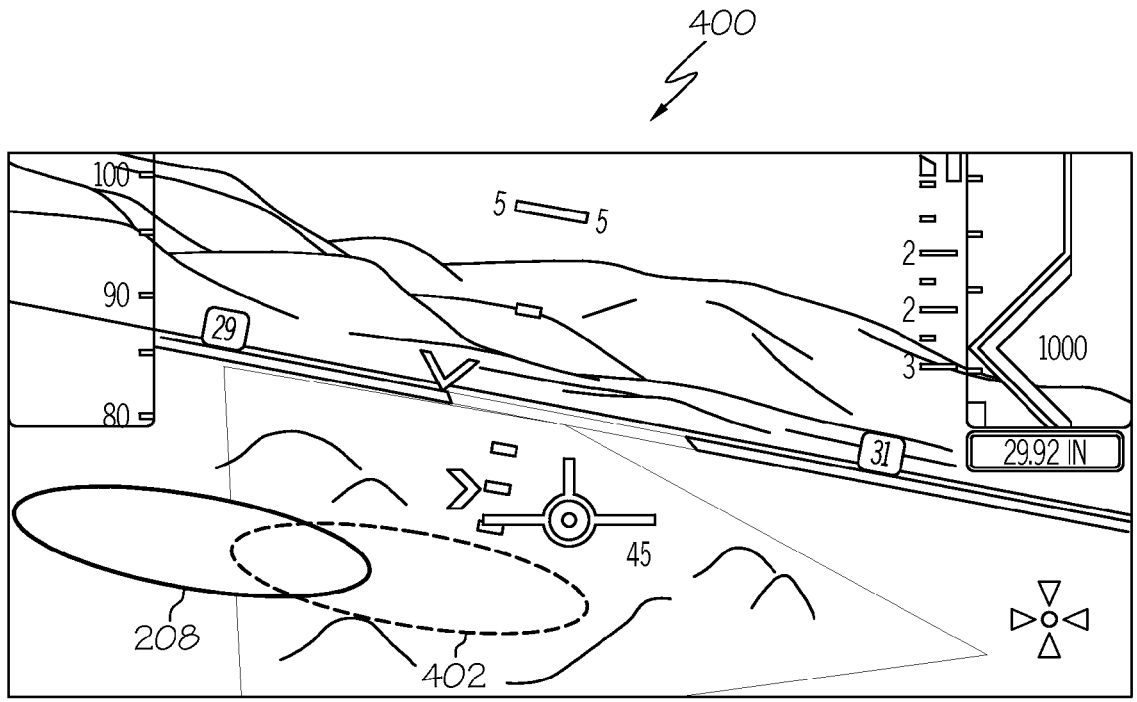
FIGS. 4-6 depict various exemplary images that may be rendered on a display device of the system of FIG. 1 while implementing the method of FIG. 3.

It is additionally seen in FIG. 4 that the image rendering display commands may, in some embodiments, cause the initial touchdown point 208 to be rendered in accordance with a first paradigm and the updated touchdown point 402 to be rendered in accordance with a second paradigm. This is so that the user may readily distinguish between the initial touchdown point 208 and the updated touchdown point 402. The first and second paradigms, as may be appreciated, may vary. For example, each may be rendered using different colors, shapes, symbols, or various combinations of these variations, just to name a few. In one particular embodiment, the first paradigm is a solid colored circle and the second paradigm is a ring that is colored differently than the solid colored circle. In a particular preferred embodiment, however, the updated touchdown point 402 is rendered at the updated touchdown point location without simultaneously rendering the initial touchdown point 208.

Before proceeding further, it was noted that the system 100 may include the above-described head tracker 108. This, at least in part, is because the eye tracker 104 generally supplies data representative of eye-in-head movement. Thus, more accurate gaze information may be determined if head position and direction are also measured. It may thus be understood that when the head tracker 108 is included, the processor 106 also processes the head movement data supplied from the head tracker 108 to determine the position and direction of the pilot's head. The determined head position and direction are added to the eye-in-head direction that is determined from the eye tracker 104 to determine gaze direction.

Figure 5:
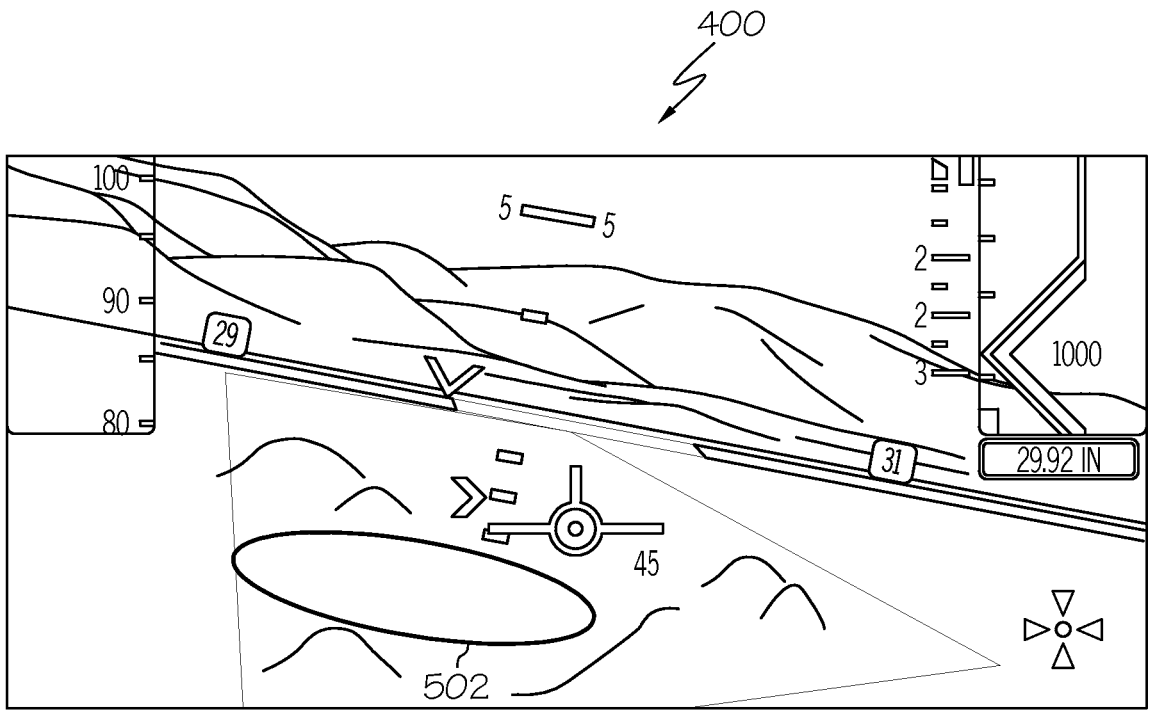

Whether or not the system 100 includes the head tracker 108, when the updated touchdown point 402 is rendered on the display device 102 at the desired location, the pilot may once operate the gaze-initiation user interface 114-1. This time, the processor 106 responds by ceasing to process the eye movement data (and head movement, if appropriate). The processor also responds, as depicted in FIG. 5, by supplying image rendering display commands to the display device 102 that causes the display device to no longer render the initial touchdown point and to render the updated touchdown point 502 in accordance with the first paradigm. Thereafter, fine adjustments to the updated touchdown point location may be made.

Figure 6:
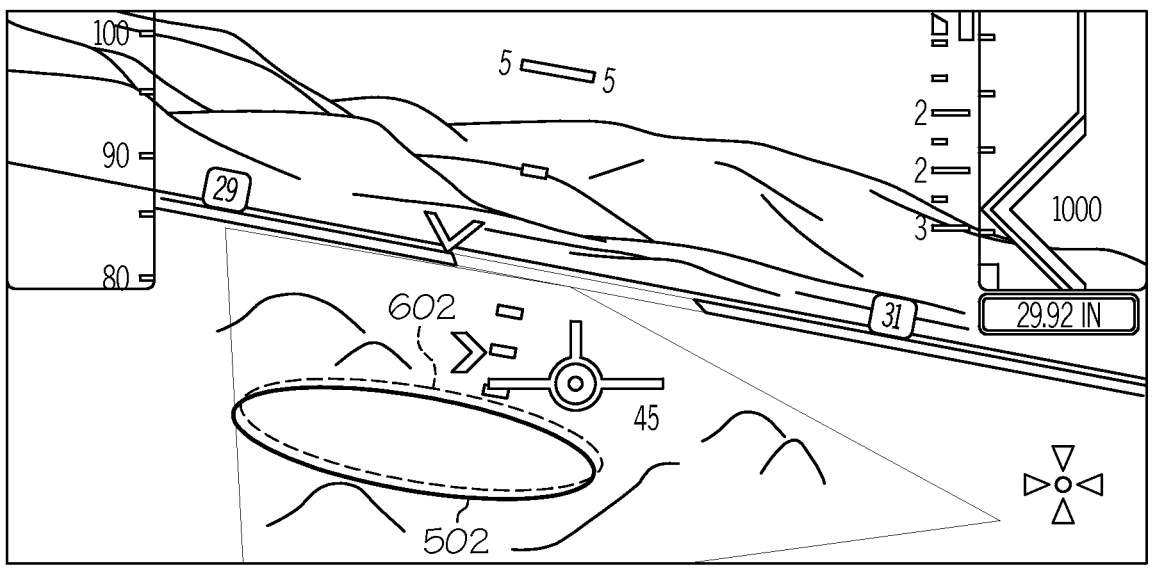

Fine adjustments to the touchdown point location are made using the fine adjustment user interface 114-2. The fine adjustment user interface 114-2, as noted above, supplies fine-tuning touchdown point location data to the processor 106. The processor 106, upon receipt of the fine-tuning touchdown point location data, determines further a updated touchdown point location. With reference to FIG. 6 it is seen that the processor 106 also supplies image rendering display commands to the display device 102 that cause the display device 102 to render a further updated touchdown point 602 (depicted in phantom in FIG. 6) at the further updated touchdown point location on the display device 102. It is seen that the further updated touchdown point 602 is not far removed from the updated touchdown point 502. This is because the fine adjustment user interface 114-2 is used to only make relatively small, incremental adjustments to the touchdown point location.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of selecting a touchdown point for a vertical takeoff and landing aircraft, comprising the steps of:
   measuring rotational movement of one or both eyes of a user with respect to the user's head and relative to an image being rendered on a display screen;
   determining an updated touchdown point location from the measured rotational movement;
   rendering an updated touchdown point at the updated touchdown point location on the display screen;
   receiving input from a user interface;
   supplying fine-tuning touchdown point location data in response to the input from the user interface;
   determining a further updated touchdown point location in response to the input from the user interface; and
   rendering, simultaneously with the updated touchdown point, a further updated touchdown point at the further updated touchdown point location on the display device.

2. The method of claim 1, further comprising the steps of:
   rendering an initial touchdown point on the display screen in accordance with a first paradigm; and
   rendering the updated touchdown point on the display screen in accordance with a second paradigm that is different than the first paradigm.

3. The method of claim 2, further comprising the steps of:
   receiving input from a user interface; and
   in response to the input from the user interface:

(i) no longer rendering the initial touchdown point on the display screen, and
(ii) rendering the updated touchdown point on the display screen in accordance with the first paradigm.

4. The method of claim 1, further comprising the step of: automatically navigating the VTOL aircraft to the updated touchdown point.

5. The method of claim 1, further comprising the steps of: tracking head movements of the user; and
determining the updated touchdown point location from the tracked eye movements and the tracked head movements.

6. The method of claim 1, further comprising the steps of: receiving terrain data from a terrain data source; and
rendering an initial touchdown point on the display device based on the terrain data received from the terrain data source.

7. The method of claim 6, further comprising the steps of: rendering the initial touchdown point on the display device in accordance with a first paradigm; and
rendering the updated touchdown point on the display device in accordance with a second paradigm that is different than the first paradigm.

8. A vertical takeoff and landing (VTOL) aircraft touchdown point selection and display system, comprising:
a display device coupled to receive image rendering display commands and configured, upon receipt of the image rendering display commands, to render an image;
an eye tracker configured to (i) measure rotational movement of one or both eyes of a user with respect to the user's head and relative to the image being rendered by the display device and (ii) supply eye movement data;
a user interface (116) in operable communication with the processor, the user interface adapted to receive user input and configured, upon receipt of the user input, to supply fine-tuning touchdown point location data and
a processor in operable communication with the display device and the eye tracker, the processor configured, upon receipt of the eye movement data, to (i) determine an updated touchdown point location and (ii) supply image rendering display commands to the display device that cause the display device to render an updated touchdown point at the updated touchdown point location, and further configured, upon receipt of the fine-tuning touchdown point location data, to (i) determine a further updated touchdown point location and (ii) supply image rendering display commands to the display device that cause the display device to render, simultaneously with the updated touchdown point, a further updated touchdown point at the further updated touchdown point location on the display device.

9. The system of claim 8, wherein the processor is further configured to:
supply image rendering display commands to the display device that cause the display device to render an initial touchdown point in accordance with a first paradigm; and
supply image rendering display commands to the display device that cause the display device to render the updated touchdown point in accordance with a second paradigm that is different than the first paradigm.

10. The system of claim 9, wherein:
the user interface is further configured to selectively supply user interface data, and
the processor is further coupled to receive the user interface data and is further configured, in response to the user interface data to supply image rendering display commands to the display device that cause the display device to (i) no longer rendering the initial touchdown point and (ii) render the updated touchdown point in accordance with the first paradigm.

11. The system of claim 10, further comprising:
a VTOL aircraft control device,
wherein the user interface is coupled to the VTOL aircraft control device.

12. The system of claim 11, wherein the VTOL aircraft control device is selected from the group consisting of a cyclic and a collective.

13. The system of claim 8, further comprising:
an aircraft autopilot in operable communication with the processor, the aircraft autopilot configured to automatically navigate the VTOL aircraft to a touchdown point.

14. The system of claim 13, wherein:
the processor is further configured to supply updated touchdown point data to the aircraft autopilot; and
the aircraft autopilot is configured, upon receipt of the updated touchdown point data, to automatically navigate the VTOL aircraft to the updated touchdown point.

15. The system of claim 8, further comprising:
a head tracker configured to (i) track head movements of the user and (ii) supply head movement data,
wherein the processor is further in operable communication with the head tracker and is further configured, upon receipt of the head movement data, to determine the updated touchdown point location from the eye movement data and the head movement data.

16. The system of claim 8, further comprising:
a terrain data source in operable communication with the processor, the terrain data source operable to supply terrain data,
wherein the processor is further configured to (i) selectively receive terrain data from the terrain data source and (ii) supply image rendering display commands to the display device that cause the display device to render an initial touchdown point on the display device based on the terrain data received from the terrain data source.

17. The system of claim 16, wherein the processor is further configured to supply image rendering display commands to the display device that cause the display device to render:
(i) the initial touchdown point in accordance with a first paradigm; and
(ii) the updated touchdown point in accordance with a second paradigm that is different than the first paradigm.

18. A vertical takeoff and landing (VTOL) aircraft touchdown point selection and display system, comprising:
a display device coupled to receive image rendering display commands and configured, upon receipt of the image rendering display commands, to render an image;
an eye tracker configured to (i) measure rotational movement of one or both eyes of a user with respect to the user's head and relative to the image being rendered by the display device and (ii) supply eye movement data;
a head tracker configured to (i) track head movements of the user and (ii) supply head movement data;
a user interface (116) in operable communication with the processor, the user interface adapted to receive user input and configured, upon receipt of the user input, to supply fine-tuning touchdown point location data; and
a processor in operable communication with the display device, the eye tracker, and the head tracker, the processor configured, upon receipt of the eye movement data and the head movement data, to (i) determine an updated touchdown point location and (ii) supply image rendering display commands to the display device that cause the display device to render an updated touchdown point at the updated touchdown point location, and further configured, upon receipt of the fine-tuning touchdown point location data, to (i) determine a further updated touchdown point location and (ii) supply image rendering display commands to the display device that cause the display device to render a further updated touchdown point at the further updated touchdown point location on the display device.

* * * * *